United States Patent [19]

Martin, Sr.

[11] Patent Number: 5,453,190
[45] Date of Patent: Sep. 26, 1995

[54] REINFORCED NET FOR RECOVERING DEBRIS ALONG A WATER BOTTOM

[76] Inventor: Jimmie Martin, Sr., 18104 W. Main St., Galliano, La. 70354

[21] Appl. No.: 217,241

[22] Filed: Mar. 24, 1994

[51] Int. Cl.[6] .................................................. A01K 73/02
[52] U.S. Cl. .................. 210/241; 210/499; 43/7; 114/244; 405/72; 37/315
[58] Field of Search .................... 210/169, 170, 210/241, 242.1, 499; 43/7; 114/234, 244, 245; 405/64, 72; 37/314, 315

[56] References Cited

U.S. PATENT DOCUMENTS

| | | | |
|---|---|---|---|
| 1,575,134 | 3/1926 | Stocking | 114/234 |
| 3,561,150 | 2/1971 | Silchenstedt | 37/315 |
| 4,040,864 | 8/1977 | Steeves | 210/242.1 |
| 4,052,800 | 10/1977 | Fuhrboter et al. | 37/314 |
| 4,053,412 | 10/1977 | Stix | 210/242.1 |
| 4,889,622 | 12/1989 | Newcombe-Bond | 210/242.1 |
| 5,350,508 | 9/1994 | Van Der Watt | 210/242.1 |

*Primary Examiner*—Robert A. Dawson
*Assistant Examiner*—W. L. Walker
*Attorney, Agent, or Firm*—Pravel, Hewitt, Kimball & Krieger

[57] ABSTRACT

A reinforced net apparatus, defined by a recovery net portion and a rear bag portion, the recovery net portion including a lower body panel portion of reinforced heavy duty netting, interconnected to left and right side panels of netting, and a top body panel portion of lightweight netting, together forming a forward debris-receiving opening. The recovery net portion would be interconnected at its rear wall to a bag portion, comprising netting, for receiving the debris collected in the recovery portion, the bag portion closed off at its rearmost end, and including elephant ears for recovering the bag portion when it is filled with debris. There is further included a lead chain member across the forward floor portion of the net and a trash chain to contact the debris and help move it into the net while the net is being pulled along the bottom of the body of water by a vessel.

16 Claims, 3 Drawing Sheets

REINFORCED NET FOR RECOVERING DEBRIS ALONG A WATER BOTTOM

BACKGROUND OF THE INVENTION

1. Field of the Invention

The apparatus of the present invention relates to recovery of debris in bodies of water. More particularly, the present invention relates to a reinforced net, pulled by a vessel, constructed to recover debris at the bottom of a body of water, into a forward portion of the net and to capture the recovered debris in a rear bag in the net until retrieved.

2. General Background

In the oil and gas industry, drilling rigs are quite numerous within bodies of water such as the Gulf of Mexico. Following the drilling of a well, and after the well has been closed, following either production at the site, or shutting down the drilling operation, the site must be left clean. In fact, there are very stringent governmental regulations which require that when a drilling site is abandoned, the drill head must be sealed a certain distance below the bottom of the body of water, and that any material which may have fallen from the rig, or may have been left at the bottom of the body of water, must be recovered. In order to assure that it has, the lessee/owner contracts the trawling to sweep a well site with a net, and if the net snags on any object below the surface, at the well site, the site is declared to be unclean, and the oil or drilling company is severely penalized and MMS will not approve the abandoned site until all debris has been removed.

In the present state of the art, oil companies are spending a considerable amount of money at abandoned well sites attempting to recover debris around the site. The most common method of recovery is to send divers down below the surface to survey the amount of debris, and attempt to bring the debris to the surface vessel for recovery. This method is very expensive, time-consuming, and may be dangerous to divers. Therefore, it is necessary that an improved method of recovering materials from an abandoned well site be developed.

SUMMARY OF THE PRESENT INVENTION

The apparatus of the present invention solves the shortcomings in the art in a simple and straightforward manner. What is provided is a reinforced net apparatus, comprising a netting material of various strengths to serve as a recovery net. The recovery net portion comprises a lower body panel portion of reinforced heavy duty netting, interconnected to left and right side panels of heavy duty netting, and a top body panel portion of netting, together forming a forward debris-receiving opening. The recovery net portion would be interconnected at its rear wall to a bag portion, comprising netting for receiving the debris collected in the recovery portion, the bag portion closed off at its rearmost end, and including strap members, including elephant ears, for recovering the bag portion when it is filled with debris and coming together to form the rear portion of the net into which the recovered debris moves for storage until the debris is brought to the surface. There is further included a lead chain member across the forward floor portion of the net to contact the debris and help move it into the net while the net is being pulled along the bottom of the body of water by a vessel.

Therefore, it is a principal object of the present invention provide a debris recovery net to be pulled by a vessel along the bottom of a body of water, comprising a forward debris recovery portion, and a rear bag portion, the net constructed of heavy weight netting on the floor and side portion, and an upper wall portion of buoyant polypropylene material which defines the recovery zone within the recovery portion of the net;

It is a further principal object of the invention to provide a debris recovery net which is constructed of two types of netting so that the net is able to support heavy debris recovered, and yet maintain buoyant within the water;

It is still a further object of the present invention to provide a net for recovering debris from a body of water which allows for recovering large, heavy objects in the debris collection portion of the net as the net is swept across the water bottom, and a rear bag portion to contain the debris as it moves through the recovery portion of the net.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
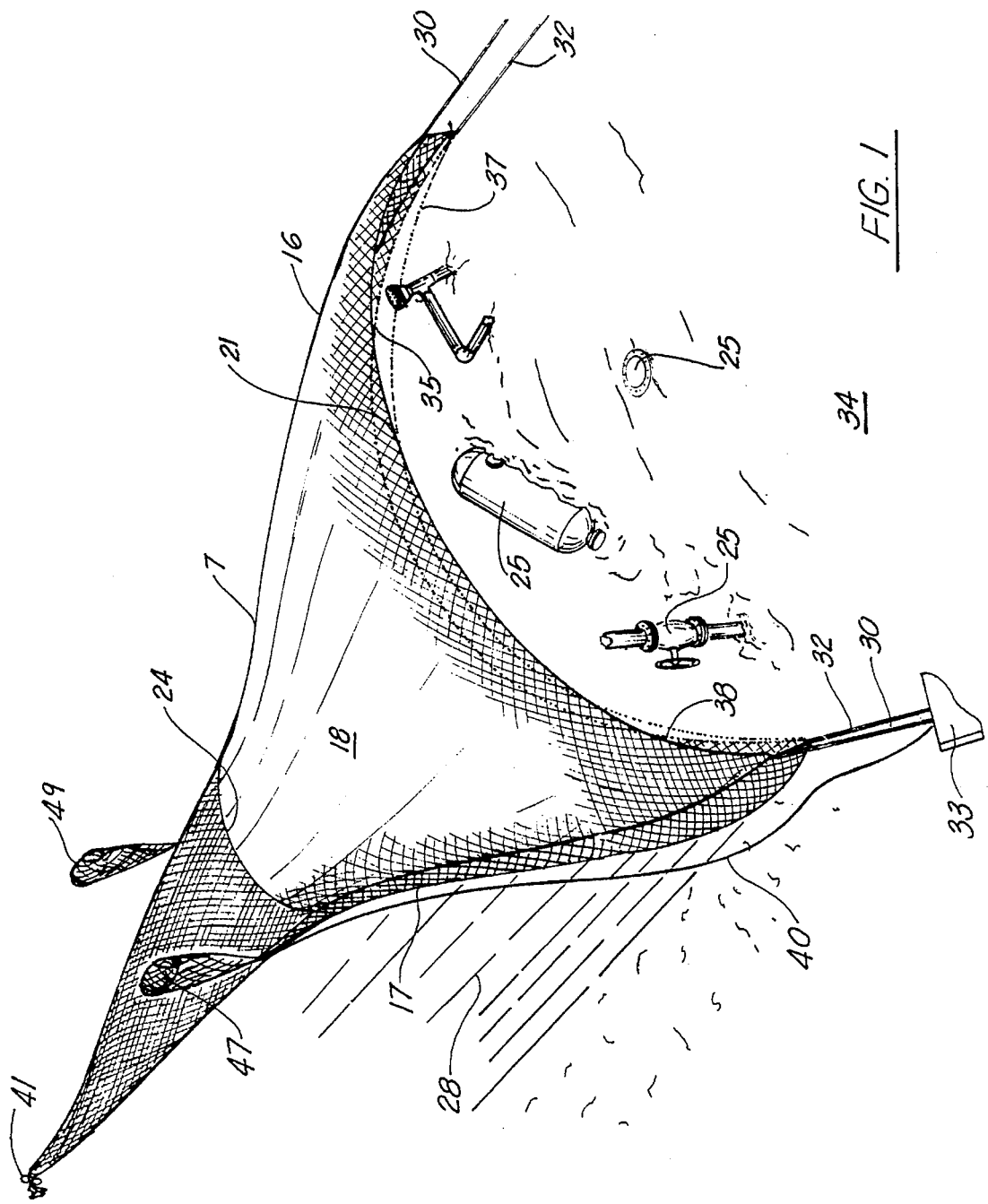
FIG. 1 illustrates an overall view of the preferred embodiment of the present invention as it is pulled along the bottom of a body of water by a vessel.
Figure 2:
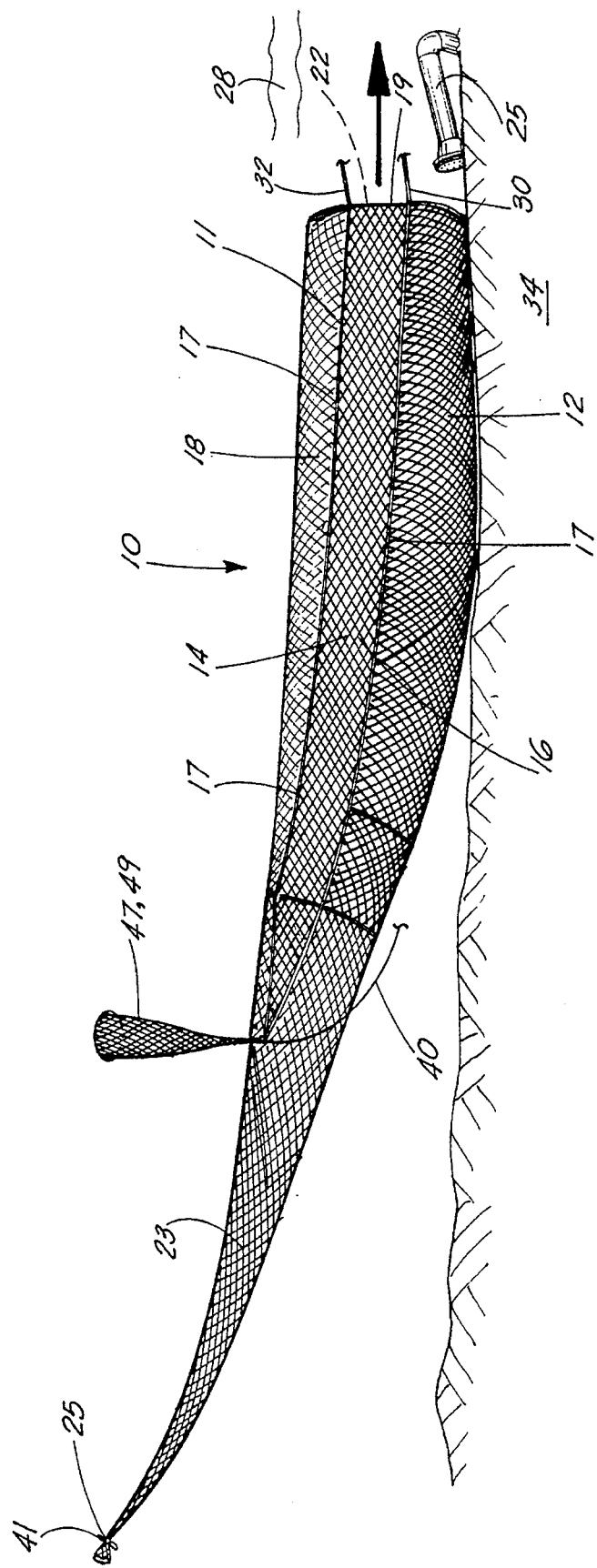
FIG. 2 illustrates an side view of the preferred embodiment of the present invention.
Figure 4:
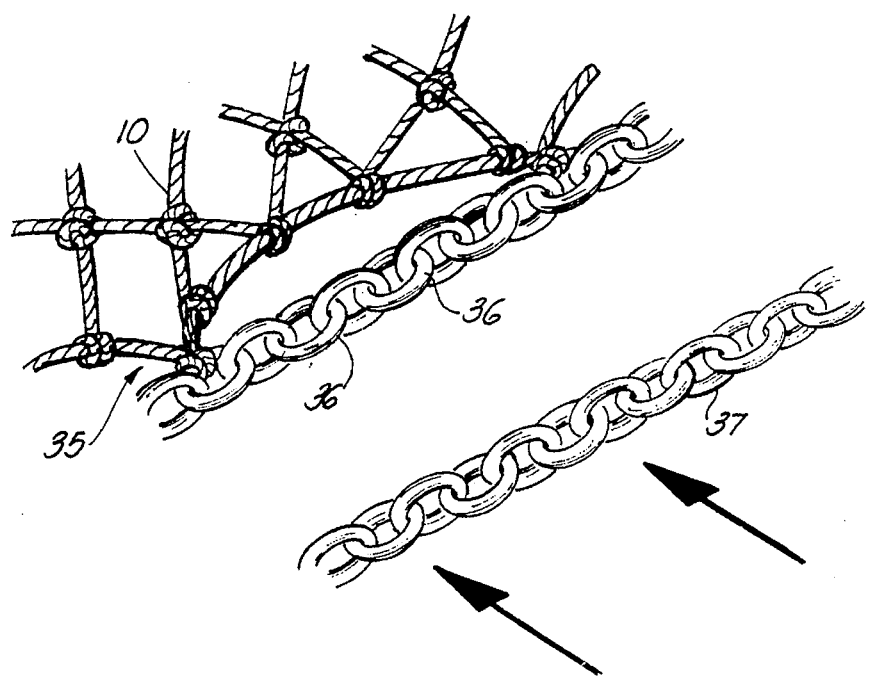
FIG. 4 illustrates a partial view of the lead chain and leading edge of the net opening in the preferred embodiment of the present invention.

FIGS. 1 through 4 illustrate the preferred embodiment of the apparatus of the present invention by the numeral 10. As illustrated in the figures, debris recovery net 10 comprises, in general, a first forward recovery portion 11, including a floor panel portion 12, a pair of side wall panels 14, 16, and a top panel portion 18. There would be included a rib cord 17 extending between the top panel 18 and side panel 14, 16, and the bottom panel 12 in the construction of the net. Further there is defined a large frontal opening of net mouth 22, for receiving debris into the recovery portion 11 of the net. The net further includes a rear bag portion 23, which is secured through stitching and the like to the rearmost edge 24 of the recovery portion 11, for containing the debris as it moves through the recovery portion 11 in the net. The rear bag portion 23 would be tied off at its rearmost end 25, and would not allow debris to pass through its rear end.

In operation, net 10 would be pulled through the body of water 28, via a vessel (unseen), and would be towed by lines 30, 32, which are rigged to the net in a typical fashion. There would also extend a breast line 19, extending vertically between the upper and lower rib cords 17 at the mouth 22 of the net. While the net 10 is pulled along the body of water, the floor panel 12 of net 10 would rest along the bottom 34 of the water 28, and would be weighed down by lead line 35, including a chain 36, interconnected along its forward lower edge 38, as seen in FIG. 1. Opening 22 of net 10 would be maintained by the type of netting utilized as the top wall 18, which would be a buoyant polypropylene material, so that as the floor panel portion 12 is weighed down by lead line 35, the top wall panel 18 would be buoyed up, to define the large opening 22, as illustrated. Further, extending between the side panels 14, 16, along the top opening of mouth 22 would be located the cork line 21, extending therebetween in order to add additional buoyancy to the upper portion 18 of the net. As is normal in nets which are towed behind vessels, there is also included a board member 33 attached to each of the tow lines 30, 32 which would accommodate an easy line 40, which would extend from board 33 to elephant ears 47, 49 for retrieving the rear pocket 23 of the net which would be filled with debris onto the boat.

The construction of the net 10 which lends itself to success in retrieving heavy objects, such as valve heads, equipment, lengths of pipe, etc., off the floor of a body of water, is due in great part to the strategic positioning and interaction of the netting material utilized throughout the recovery portion 11 and the rear bag portion 23 of the net 10. For example, the top wall panel portion 18 is constructed of 4-inch mesh of #96 polypropylene which gives it its buoyancy to maintain the net opening 22 during towing of the net. The side panels 14, 16 are also constructed of 4-inch stretch mesh of #96 polypropylene, and would preferably measure 20.5 meshes wide by 190 meshes deep, with a seam at 60 meshes from the breast line. On the other hand, the floor panel 12, which is responsible for catching most of the debris which enters into net recovery portion 11, is constructed of 4-inch stretch, 6 mm braided polypropylene. It measures 110 meshes deep by 202 meshes wide at the lead line, and tapers back, preferably at a ratch of 4:1 to 56 meshes wide at the bag portion 23 of the net 10. This heavy duty mesh, which comprises floor portion 12, enables the net to recover large items without tearing the mesh of the net.

Figure 3:
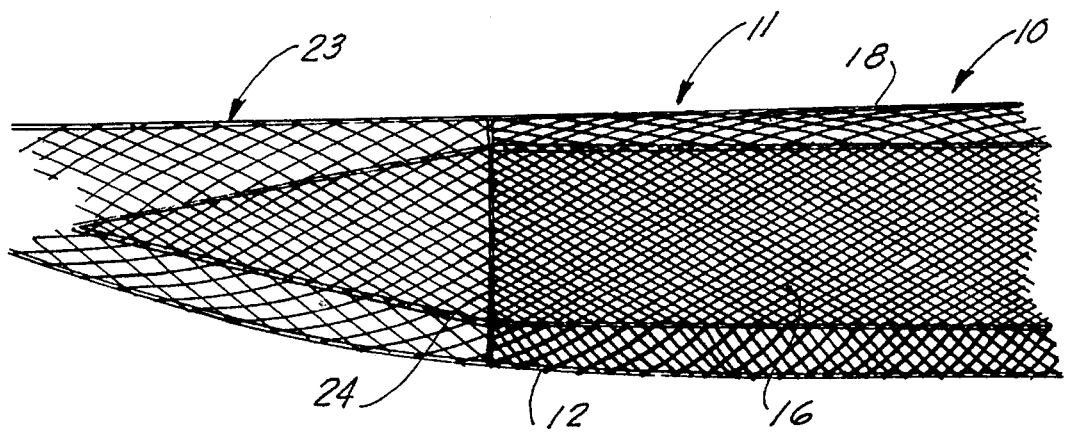
FIG. 3 illustrates a partial side view of the preferred embodiment of the present invention.

As illustrated, the opening of net 10 is reinforced to receive the debris entering thereunto. This opening comprises a lead line 35 constructed of a combination stainless steel ⅝" trawl cable covered with polypropylene fabric 150 feet in length, and is reinforced with ⅜-inch straight chain 36 along its length so as to provide extra strength when debris passes over the line 35 into the recovery portion 11, as seen in FIG. 3. Directly preceding straight chain 36, there is positioned a trash chain 37, positioned 24 inches in front of lead line 35 respectively, so that as net 10 is dragged along the floor of the body of water 28, the trash chain 37 makes the initial contact with the debris, and either upset it for recovery into the net, or by protecting the net material from large debris.

Turning now to the rear bag portion 23 of net 10, the bag portion 23 is constructed of 100 meshes round by 60 meshes deep, and includes 3-inch galvanized rings 41 which are ⁵⁄₁₆-inches in diameter sewn to the floor of the bag 23 for opening and closing. There are included at least two elephant ears, 47, 49, extending along the rear end 25 of bag portion 23, which are utilized with galvanized rings 41 in retrieving the rear end of bag 23 into the boat for emptying when filled with debris.

It is critical in the construction that the net include the heavy duty mesh net as its bottom and front side panels, since the greater portion of the debris entering the net contacts this wall areas first. Additionally, the top wall is constructed of lighter weight mesh, so as to provide the necessary buoyancy to maintain the net forward opening in the open position during the recovery process. Further, the rear bag portion must be constructed of the same heavy duty mesh material as the bottom and side panels, so that the debris can be kept in the bag portion until it is recovered and emptied into the boat. The combination of the two trash chains which precede the net, and the reinforced lead line including the chain to weigh it down to the water bottom, provide a means for protecting the net material from damage.

The apparatus would further include two left and right wing members which would be preferably constructed of 4-inch stretch means of #96 polypropylene netting material, and two left and right bottom wing members constructed preferably of 4-inch stretch mesh 6 mm braided polypropylene netting material. Further, the rear bag portion in the side panels are defined by 4-inch stretch mesh #96 nylon netting material, and the rear bag storage portion secured to the recovery portion would be defined by 4-inch stretch mesh #96 nylon netting material in the preferred embodiment. In addition, the trash chains would be defined by ⅜-inch high test chain material in the preferred embodiment.

The following table lists the part numbers and part descriptions as used herein and in the drawings attached hereto.

| PARTS LIST | |
| --- | --- |
| Part Number | Description |
| 10 | recovery net |
| 11 | first forward portion |
| 12 | floor panel portion |
| 14, 16 | side wall panels |
| 17 | rib cords |
| 18 | top panel |
| 19 | breast line |
| 21 | cork line |
| 22 | frontal net mouth |
| 23 | rear bag portion |
| 24 | rear most edge |
| 25 | rear most end |
| 28 | body of water |
| 30, 32 | tow lines |
| 33 | board member |
| 34 | water bottom |
| 35 | lead line |
| 36 | straight chain |
| 38 | forward lower edge |
| 37 | trash chain |
| 40 | easy line |
| 41 | galvanized rings |
| 47, 49 | elephant ears |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A debris recovery net apparatus, for recovering debris from the bottom of a body of water, comprising:
    a) a first recovery portion, comprising at least side walls and a reinforced bottom wall further comprising braided polypropylene netting material, a top wall, together defining a debris recovery space therein;
    b) a forward opening in the net recovery space for allowing debris to move into the debris recovery space;
    c) a rear bag storage portion, secured to the recovery portion, and closed off at its rearmost end for containing the debris until retrieved; and
    d) means preceding the first recovery portion for contacting the debris to facilitate moving the debris into the first recovery portion.

2. The apparatus in claim 1, further comprising a lead line secured to a forward edge of the first recovery portion, and further including a chain to weigh a lower edge of the recovery portion onto the water bottom.

3. The apparatus in claim 1, wherein the braided polypropylene netting material comprising the reinforced bottom wall is 4-inch stretch, 6 mm material.

4. The apparatus in claim 1, wherein the rear bag portion and the side walls are defined by 4-inch stretch mesh #96 nylon netting material.

5. The apparatus in claim 1, wherein the means preceding the first recovery portion for contacting the debris would further comprise trash chains defined by ⅜-inch high test chain material.

6. The apparatus in claim 1 further comprising at least a left wing and at least a right wing constructed of 4-inch stretch means of #96 polypropylene netting material.

7. The apparatus in claim 1 further comprising at least a left bottom wing and at least a right bottom wing constructed of 4-inch stretch mesh 6 mm braided polypropylene netting material.

8. A debris recovery net apparatus, for recovering debris from the bottom of a body of water, as the net is pulled along the water bottom by a vessel, the apparatus comprising:

a) a first recovery portion, comprising at least side walls and a reinforced bottom wall of 4-inch stretch, 6 mm braided polypropylene netting material, a top wall, together defining a debris recovery space therein;

b) a forward opening in the net recovery space for allowing debris to move into the debris recovery space;

c) a rear bag storage portion, secured to the recovery portion, and closed off at its rearmost end for receiving the debris collected in the first recovery portion and containing the debris until retrieved; and d) trash chain means preceding the first recovery portion for contacting the debris to facilitate moving the debris into the first recovery portion.

9. The apparatus in claim 8, wherein the rear bag portion and the side walls are defined by 4-inch stretch mesh nylon netting material.

10. The apparatus in claim 8, wherein the trash chains are defined by ⅜-inch high test chain material.

11. The apparatus in claim 8 further comprising at least a left wing and at least a right wing each constructed of 4-inch stretch means of #96 polypropylene netting material.

12. The apparatus in claim 8 further comprising at least a left bottom wing and at least a right bottom wing each constructed of 4-inch stretch mesh 6 mm braided polypropylene netting material.

13. A debris recovery net apparatus, for recovering debris from the bottom of a body of water, as the net is pulled along the water bottom by a vessel, the apparatus comprising:

a) a first recovery portion, comprising at least side walls and a top wall, the side walls and the top wall defined by 4-inch stretch mesh #96 nylon netting material, a reinforced bottom wall, defined by 4-inch stretch, 6 mm braided polypropylene netting material, the top wall, bottom wall, and side walls together defining a debris recovery space therein;

b) a forward opening in the net recovery space for allowing debris to move into the debris recovery space;

c) a rear bag storage portion, secured to the recovery portion, defined by 4-inch stretch mesh #96 nylon netting material, and closed off at its rearmost end for receiving the debris collected in the first recovery portion and containing the debris until retrieved; and d) at least one trash chain preceding the first recovery portion for contacting the debris to facilitate moving the debris into the first recovery portion.

14. The apparatus in claim 13, wherein the trash chain is defined by ⅜-inch high test chain material.

15. The apparatus in claim 13, further comprising at least a left wing and at least a right wing each constructed of 4-inch stretch means of #96 polypropylene netting material.

16. The apparatus in claim 13, further comprising at least a left bottom wing and at least a right bottom wing each constructed of 4-inch stretch mesh 6 mm braided polypropylene netting material.

* * * * *